United States Patent
Tsukamoto

(10) Patent No.: US 7,054,056 B2
(45) Date of Patent: May 30, 2006

(54) OPTICAL ELEMENT, SPECTROSCOPE AND CONDENSER

(75) Inventor: Hiroyuki Tsukamoto, Kumagaya (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 11/080,270

(22) Filed: Mar. 14, 2005

(65) Prior Publication Data

US 2005/0191021 A1   Sep. 1, 2005

Related U.S. Application Data

(63) Continuation of application No. PCT/JP03/12480, filed on Sep. 30, 2003.

(30) Foreign Application Priority Data

Oct. 2, 2002   (JP)   ............... 2002-289963

(51) Int. Cl.
*G02F 1/00*   (2006.01)
*G02B 6/10*   (2006.01)
(52) U.S. Cl. ...................... 359/321; 385/129
(58) Field of Classification Search ............... 359/321; 385/129
See application file for complete search history.

(56) References Cited

U.S. PATENT DOCUMENTS 6,522,448 B1 *   2/2003   Baba et al. .................. 359/241

2001/0012149 A1 *   8/2001   Lin et al. .................... 359/344
2002/0027696 A1   3/2002   Baba et al.
2002/0041425 A1   4/2002   Baba et al.

FOREIGN PATENT DOCUMENTS

JP   59-46602 A   3/1984
JP   2001-091701 A   4/2001

OTHER PUBLICATIONS

"Fotonikku Kessho Kenkyu no Genjo to Shorai Tembo Current Conditions and Future Development of Photonic Crystal Research" Optoelectronic Industry and Technology Development Association, Mar. 2000, [Partial Translation of pp. 8-9 is provided].

* cited by examiner

*Primary Examiner*—David N. Spector
(74) *Attorney, Agent, or Firm*—Frishauf, Holtz, Goodman & Chick, P.C.

(57) ABSTRACT

In a photonic crystal 1, the refractive index of the medium 2, the period of the lattice, and the like are fixed; however, the size of the air holes 3 gradually varies in the direction of the z axis. Almost all of the light 4 with a vibration number in the vicinity of 0.61 advances directly at the time of incidence on the crystal; however, the direction of advance varies as the size of the holes decreases. On the other hand, as the vibration number increases, the optical path of the light is greatly bent as shown in 5 and 6. Accordingly, a large variation in the angle of refraction can be caused to occur in light with an extremely small wavelength range, so that light splitting with a good resolution can be accomplished.

12 Claims, 5 Drawing Sheets

$\lambda_1 > \lambda_2 > \lambda_3$

OPTICAL ELEMENT, SPECTROSCOPE AND CONDENSER

This is a continuation from PCT International Application No. PCT/JP03/12480 filed on Sep. 30, 2003, which is hereby incorporated by reference

TECHNICAL FIELD

The present invention relates to an optical element based on a photonic crystal, and a spectroscope (spectroscpic device) and a condenser (light gathering device) using this optical element.

BACKGROUND ART

In most cases, high-performance optical elements which are extremely small are required in optical circuits and the like. In recent years, techniques in which photonic crystals are used in such microscopic optical elements have been widely researched. It is known that photonic crystals have extreme properties such as the complete reflection of light regardless of the direction of incidence due to a photonic band gap, variation in the velocity and direction of light due to abnormal dispersion, and that such crystals have numerous properties that are convenient for controlling light. Such photonic crystals and applications of photonic crystals are described in "Fotonikku Kessho Kenkyu no Genjo to Shorai Tembo Current Conditions and Future Development of Photonic Crystal Research" Optoelectronic Industry and Technology Development Association, March, 2000."

Furthermore, Japanese Patent Application Kokai No. 2001-91701 discloses a technique in which an interference filter that transmits light of various wavelength regions is manufactured in a single substrate, or in which a waveguide type superprism with the center wavelength of the split light differing according to the incident position of the light is created, by varying one or more directions of the fundamental period of a periodic structural body either gradually or in gentle stages in spatial terms, or by varying one or more lengths of the fundamental period of a periodic structural body either gradually or in gentle stages in spatial terms in a photonic crystal, and a technique in which a bent waveguide path is formed by a similar method in a three-dimensional photonic crystal.

Although photonic crystals show conspicuous properties with respect to light, such functions are manifested only at interfaces between the photonic crystals and other media (as in the case of optical elements based on ordinary glass or crystals). In the interiors of the photonic crystals, light merely advances in a straight line at a fixed velocity. Accordingly, photonic crystals are not always suitable for the precise control of light. For example, in cases where a spectroscopic element is constructed, the wavelength range in which an abnormal dispersion is shown at a constant angle of incidence is limited, and in most cases, the dispersion is small elsewhere even compared to ordinary crystals. Accordingly, in ordinary photonic crystals, the splitting of light is limited to splitting the light in an extremely narrow band.

Furthermore, photonic crystals tend to show a loss caused by reflection, scattering, and the like at the boundaries with ordinary substances and other photonic crystals. This loss tends to be especially large in cases where abnormal dispersion is generated, and it is difficult to avoid such problems. Accordingly, in cases where optical systems are constructed using photonic crystals, it is important to heighten the function of one photonic crystal while minimizing the surfaces of the photonic crystals (i.e., reducing the number of photonic crystals).

Furthermore, the technique described in the above-mentioned Japanese Patent Application Kokai No. 2001-91701 involves the manufacture of an interference filter that allows the passage of light of various wavelength regions in a single substrate, and this patent application also discloses a technique for a waveguide type superprism in which the center wavelength of the split light differs according to the position of incidence. However, there is no mention of varying the refraction angle of the light according to the wavelength, or controlling the direction of advance of the light in the interior of the photonic crystal, by varying the structure of the crystal.

SUMMARY OF THE INVENTION

The present invention was devised in light of such facts. The object of the present invention is to provide an optical element based on a photonic crystal with a heightened light controlling function, and a spectroscope and a condenser using this optical element.

The first invention that is used to achieve this object is an optical element using a photonic crystal which is constructed so that the constituent ratio of the substances with different refractive indices that make up the photonic crystal gradually varies at a fixed period length proceeding in at least one axial direction.

Photonic crystals are crystals in which a periodic structure is formed using dielectrics or compound semiconductors (one of which may be air or a vacuum) that have different refractive indices. Commonly known photonic crystals are photonic crystals in which periodic holes are formed in a dielectric or the like, and photonic crystals in which a dielectric or the like is periodically formed into a multi-layer structure. However, photonic crystals are not limited to such crystals. The present invention is devised so that the constituent ratio (per unit deposition) of the substances with different refractive indices that make up the photonic crystal gradually varies proceeding in at least one axial direction in a photonic crystal that has a two-dimensional or three-dimensional structure.

In a photonic crystal, in cases where a modification is made to the periodic structure, a band structure model is generally no longer applicable. However, in cases where the modification is extremely small, a state is produced in which the basic band structure itself is preserved, and an extremely small perturbation is added to this. Under such conditions, the variation, in a band itself is also extremely small; accordingly, the velocity and direction of advance of the light are gradually varied inside the crystal. Furthermore, as in cases where the refractive index continuously varies inside an ordinary medium, there is basically no loss due to reflection or the like.

Such light behavior in a photonic crystal can be compared with that in GRIN (refractive index distribution type) optical elements with respect to optical glass. In the case of optical elements constructed from an ordinary optical glass, the direction of advance of the light is varied only at interfaces between the optical elements and other media such as air. In the case of GRIN optical elements, since the direction of advance of the light varies within the medium, such elements can have functions such as condensing (light gathering). The optical element of the present invention operates on a similar principle; however, the modulation effect caused by the band variation of a photonic crystal is usually far greater than the refractive index variation in a GRIN element, so that a more dramatic effect can be manifested. In particular, an effect caused by the bending of light inside the crystal may be expected.

By thus causing the constituent ratio of the substances with different refractive indices that make up the photonic crystal to vary gradually, it is possible to cause the direction of advance and transmissivity of the light to vary according to the wavelength not only at the interfaces between the photonic crystal and other substances, but also in the interior of the photonic crystal. Accordingly, it is possible to obtain an optical element with superior characteristics not seen in conventional optical elements in which the control of light is possible only at the interfaces between the photonic crystal and other substances.

In Japanese Patent Application Kokai No. 2001-91701, the period of the crystal structure is varied. However, in cases where the period is varied, there may be a deleterious effect caused by a relative positional shift of the unit structures. Accordingly, it is most desirable that the constituent ratio of the substances that make up the crystal be varied as in the present invention. For example, in the case of a two-dimensional photonic crystal with a structure in which cylindrical columns are regularly arranged, the constituent ratio can be varied by varying the diameter of the cylindrical columns.

The second invention that is used to achieve the object described above is an optical element based on a photonic crystal which is constructed so that the direction of advance of the light with respect to the crystal axes shows a specified variation as the light advances through the interior of the crystal.

In this invention as well, it is possible to obtain an optical element having superior characteristics not seen in a conventional optical element in which the control of light is possible only at the interfaces between the photonic crystal and other substances.

The third invention that is used to acheive the object described above is a spectroscope using the first invention or second invention.

If the first invention is used, as was described above, the direction of advance of the light can be varied according to the wavelength, not only at the interfaces between the photonic crystal and other substances, but also in the interior of the photonic crystal. Accordingly, if this property is utilized, it is possible to perform light splitting with a good resolution by causing a large variation in the angle of refraction for light in an extremely small wavelength range.

The fourth invention that is used to achieve the object described above is a spectroscope which uses a photonic crystal that is constructed so that the structure gradually varies proceeding in at least one axial direction in the interior of the crystal, and which is constructed so that the crystal structure gradually varies in the path of advance of the light that is incident on this crystal.

The direction of advance and transmissivity of the light can be varied according to the wavelength not only at the interfaces between the photonic crystal and other substances, but also in the interior of the photonic crystal, by gradually varying not only the constituent ratio of the substances with different refractive indices that make up the photonic crystal, but also the shapes, refractive indices, structural periods, and the like of the substances that make up the photonic crystal. Accordingly, since the direction of advance of the light can be varied according to the wavelength in the interior of the crystal as well (unlike the case of a conventional optical element in which the control of light is possible only at the interfaces between the photonic crystal and other substances), a spectroscope with a high resolution can be obtained.

Furthermore, in this invention, unlike the case of the third invention described above, the shapes, refractive indices, structural periods, and the like of the substances that make up the photonic crystal are caused to vary gradually. Among these methods, a method in which the shapes of the substances that make up the crystal are varied involves some difficulty in cases where wavelengths of a few µm or less are the object, and precise control is also difficult in the case of a method in which the refractive indices are varied. Furthermore, in cases where the period is varied, as was described above, there may be deleterious effects caused by the shifting of the relative positions of the unit structures. Accordingly, compared to the third invention described above, this invention is difficult to realize; however, this invention is not impracticable.

The fifth invention that is used to achieve the object described above is the third invention or fourth invention, which is further characterized in that the angle formed by the direction of incidence of the light that is the object of light splitting on the photonic crystal and the first axis is 45° or less.

If the angle formed by the direction of incidence of the light that is the object of light splitting and the first axis is set at 45° or less, the component that is oriented in the direction of the first axis among the components of the direction of advance of the light that is the object of light splitting is increased. Accordingly, the effect of the variation of the crystal in the first axial direction can be increased, so that light splitting can be efficiently performed.

The sixth invention that is used to achieve the object described above is a condenser using the first invention or second invention.

As was described above, if the first invention or second invention is used, the direction of advance of the light can be varied according to the wavelength not only at the interfaces between the photonic crystal and other substances, but also in the interior of the photonic crystal. Accordingly, if this property is utilized, the optical paths of light incident on different positions of the photonic crystal can be bent in the interior of the photonic crystal, so that condensing can be accomplished.

The seventh invention that is used to achieve the object described above is a condenser using a photonic crystal which is constructed so that the structure gradually varies proceeding in at least one axial direction in the interior of the crystal.

As was described above, the direction of advance and transmissivity of the light can be varied according to the wavelength not only at the interfaces between the photonic crystal and other substances, but also in the interior of the photonic crystal, by gradually varying not only the constituent ratio of the substances with different refractive indices that make up the photonic crystal, but also the shapes, refractive indices, structural periods, and the like of the substances that make up the photonic crystal. Accordingly, since the direction of advance of the light can be varied according to the wavelength in the interior of the crystal as well (unlike the case of a conventional optical element in which the control of light is possible only at the interfaces between the photonic crystal and other substances), a condenser with a high resolution can be obtained.

Furthermore, in this invention, unlike the case of the sixth invention described above, the shapes, refractive indices, structural periods, and the like of the substances that make up the photonic crystal are caused to vary gradually. Among these methods, a method in which the shapes of the substances that make up the crystal are varied involves some difficulty in cases where wavelengths of a few μm or less are the object, and precise control is also difficult in the case of a method in which the refractive indices are varied. Furthermore, in cases where the period is varied, as was described above, there may be deleterious effects caused by the shifting of the relative positions of the unit structures. Accordingly, compared to the sixth invention described above, this invention is difficult to realize; however, this invention is not impracticable.

The eight invention that is used to achieve the object described above is the sixth invention or seventh invention, which is further characterized in that the angle formed by the direction of incidence of the light that is the object of condensing on the photonic crystal and the first axis is 45° or greater.

If the angle formed by the direction of incidence of the light that is the object of condensing on the photonic crystal and the first axis is set at 45° or greater, the degree of dispersion of the incident light with respect to first axis increases. Accordingly, the degree of variation in the photonic crystal in the position of incidence of the light can be increased, so that light can be efficiently condensed.

BEST MODE FOR CARRYING OUT THE INVENTION

Figure 1:
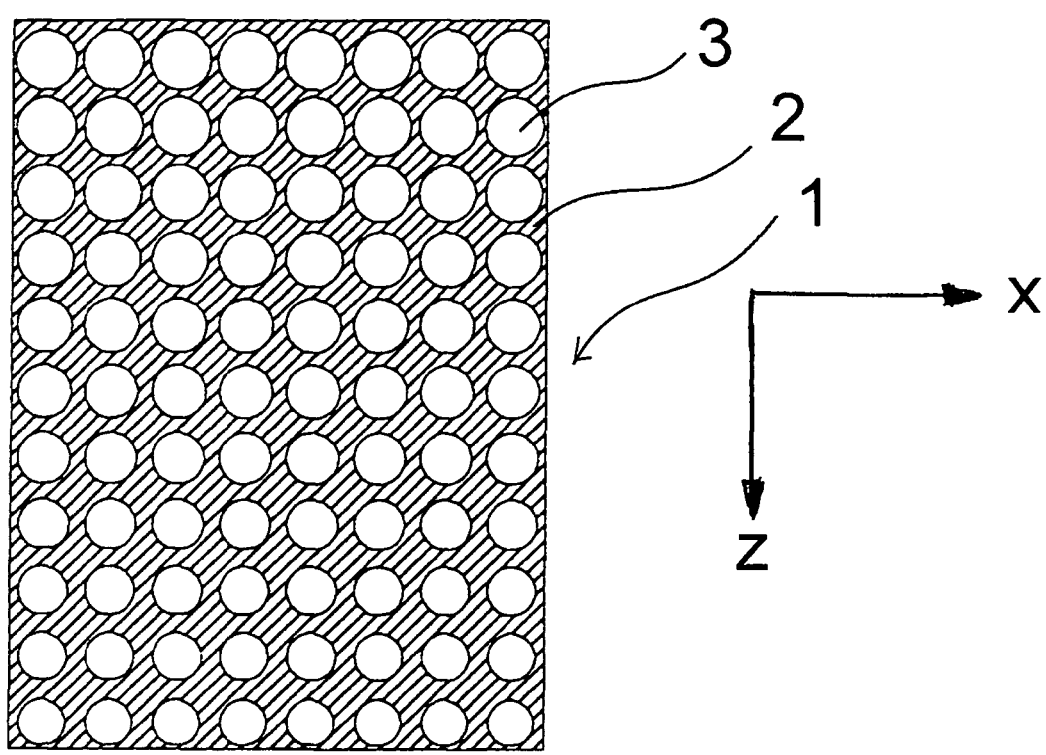
FIG. 1 is a model diagram which shows an example of the structure of the photonic crystal used in a working configuration of the present invention.

Working configurations of the present invention will be described below with reference to the figures. FIG. 1 is a diagram showing an outline of the structure of a photonic crystal which forms an optical element constituting one example of a working configuration of the present invention. This photonic crystal 1 has a two-dimensional structure, and has a shape in which round air holes 3 are arranged in the configuration of a square lattice in a medium 2 consisting of BN (boron nitride). If the left-right direction in the plane of the page is taken as the x axis, the vertical direction in the plane of the page is taken as the z axis, and the direction perpendicular to the plane of the page is taken as the y axis, then the air holes 3 are formed in the direction of the y axis inside the photonic crystal 1.

The refractive index, lattice period, and the like of the medium 2 are constant; however, the size of the air holes 3 gradually varies in the direction of the z axis. Such a two-dimensional structure can be created by a method such as lithography; accordingly, it is relatively easy to vary the structure.

In order to manufacture the photonic crystal 1 with the structure shown in FIG. 1, for example, a BN substrate having a specified thickness is prepared, and a resist layer is formed on one surface of this substrate. Then, using photolithography, an exposure according to the size of the air holes 3 is performed on the areas where it is desired to form these air holes 3, and the resist is developed and removed. Then, when the BN substrate is etched by dry etching using the remaining resist as a mask, air holes 3 that pass through the BN substrate can be formed with a high aspect ratio. Subsequently, the remaining resist is removed, thus completing a photonic crystal with the structure shown in FIG. 1.

The properties of this photonic crystal will be described below; in the following description, values that are normalized by the lattice constant a will be used for the radius of the holes, the vibration number of the light, and the frequency of the light. Specifically, where r' is the actual hole radius, ω' is the actual vibration number of the light, and k' is the actual frequency of the light, r=r'/a is used as the radius, ω=ω'a/2πc is used as the vibration number of the light, and k=k'/2πa is used as the frequency of the light. Here, c is the velocity of light in a vacuum.

Figure 2:
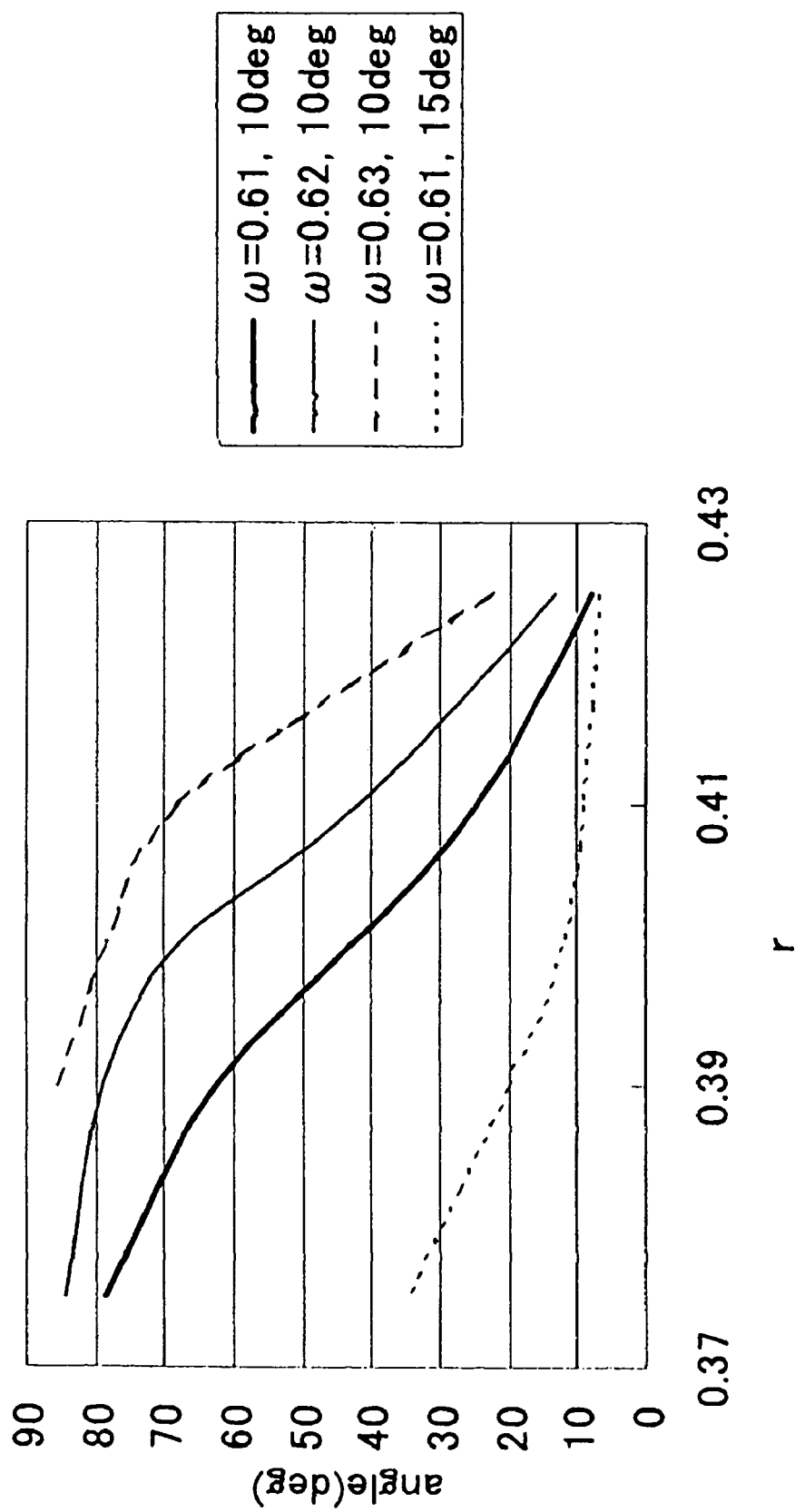
FIG. 2 is a diagram which shows an example of the relationship between the void radius and the angle of refraction in a photonic crystal in which cylindrical voids with equal radii are formed in a lattice configuration in the medium. The horizontal axis indicates r (the hole radius), and the vertical axis indicates the angle of refraction (°).

In a photonic crystal in which BN is used as the medium, and uniform round air holes are formed in the configuration of a square lattice, abnormal dispersion occurs when the angle of incidence of the light on the crystal is in the vicinity of 10° under the conditions in which the refractive index n of the medium is 2.117, r=0.4, and ω=0.61. FIG. 2 shows the relationship between the size of the air holes and the direction of advance (angle of refraction) of the light in cases where light rays with vibration numbers of 0.61, 0.62 and 0.63 are incident at an angle of incidence of 10° on a photonic crystal with such a uniform structure.

In FIG. 2, the thick solid line indicates a case in which the angle of incidence is 10° and ω is 0.61, the thin solid line indicates a case in which the angle of incidence is 10° and ω is 0.62, and the thick broken line indicates a case in which the angle of incidence is 10° and ω is 0.63. It is seen from FIG. 2 that even if r is the same, the direction of advance of the light in the photonic crystal, i.e., the angle of refraction, differs according to differences in ω, so that the light is dispersed, and at the same time, it is also seen that a great difference is generated in the direction of advance of the light according to differences in r.

If the fact that the direction of advance of the light varies greatly according to r is utilized, then, it is possible to cause the direction of advance of the light to vary in accordance with the wavelength in the interior of the photonic crystal as well, by gradually varying the magnitude of r in the direction of the z axis as shown in FIG. 1. By utilizing this, it is possible to split light in an extremely small wavelength range at a large light splitting angle.

Figure 3:
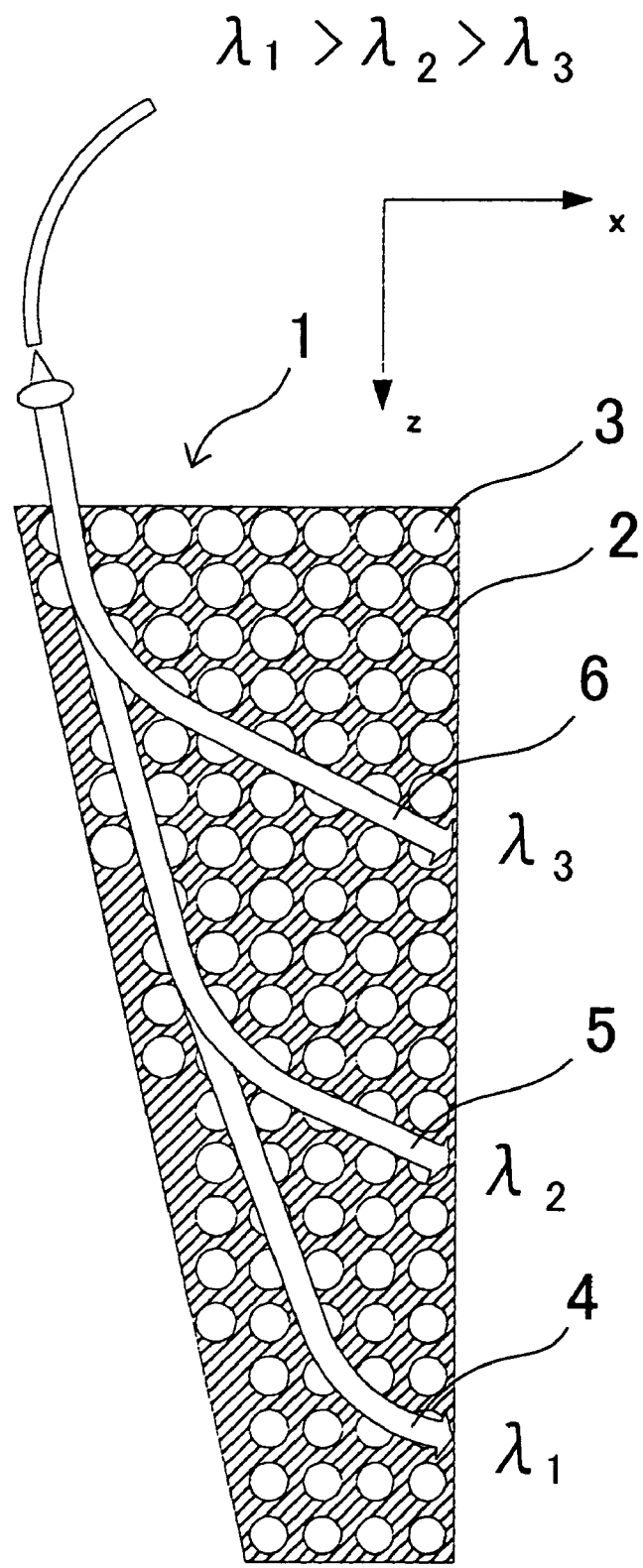
FIG. 3 is a model diagram showing a spectroscope constituting a working configuration of the present invention which is constructed using an element of the type shown in FIG. 1.

FIG. 3 shows an example of a spectroscope constructed using an element of the type shown in FIG. 1. The maximum value of r is 0.425, and this spectroscope has a structure in which r decreases in the direction of the z axis. Furthermore, FIG. 3 is a model diagram; the period of the structure of an actual photonic crystal is much smaller than this. The incident light is incident on the crystal at an angle of incidence of 10° with respect to the z axis. At the time of incidence on the crystal, the light 4 (wavelength $\lambda_1$) in the vicinity of a vibration number of 0.61 advances more or less linearly; however, the direction of advance varies as the size of the holes decreases. On the other hand, as the vibration number increases, the optical paths of the light are bent to a greater extent as indicated by 5 (wavelength $\lambda_2$) and 6 (wavelength $\lambda_3$).

At respective points within the crystal, the direction $\theta$ in which the light rays advance is determined by the vibration number $\omega$, the x component $k_x$ of the frequency k, and the size r of the hole at the position in question, and can be expressed as follows:

$$\theta(\omega, k_x, r(z))$$

The concrete value of $\theta$ can be determined as the normal direction of the curve on the cross-section at a fixed band vibration number by performing band analysis of the photonic crystal. If these results are used, it is seen that the light rays pass through the following path:

$$x(z) = \int_0^z \tan\{\theta(\omega, k_x, r(\varsigma))\} d\varsigma$$

Figure 4:
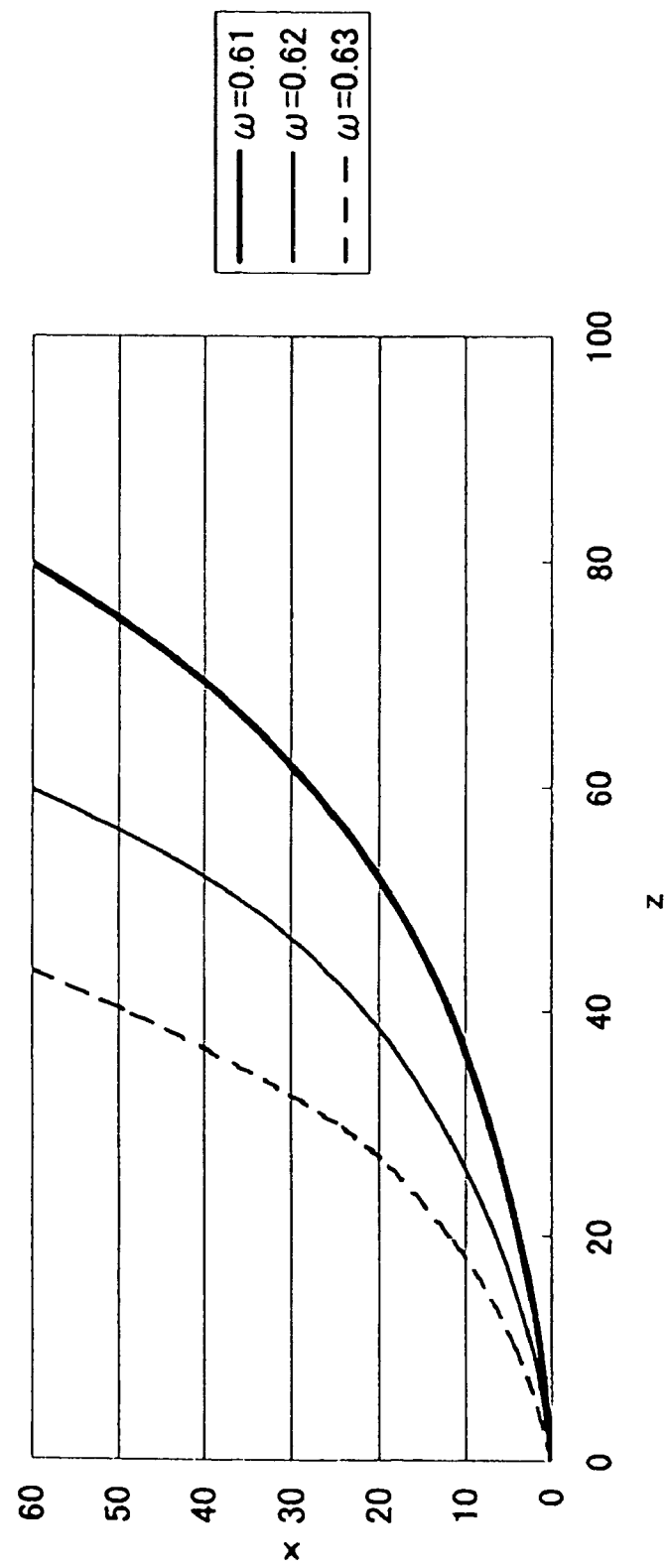
FIG. 4 is a diagram showing an example of the optical paths of light of various wavelengths in the photonic crystal in the spectroscope shown in FIG. 3.

The optical paths for vibration numbers of 0.61, 0.62 and 0.63 determined by performing these calculations are shown in FIG. 4. These are values determined for cases in which the amount of variation in the radius of the holes was fixed as follows:

$$dr/dz = -0.0005$$

Furthermore, the incident position of the light rays is taken as the origin.

In this construction, the direction of advance of the light rays incident on the crystal in the abnormal dispersion portion corresponding to the wavelength varies greatly in the direction of the x axis, and the light rays are emitted from the side surface. In the case of ordinary photonic crystals, only light with a vibration number in a narrow range showing abnormal dispersion can be split. In this construction, on the other hand, since the band structure in the optical paths varies, light splitting can be performed in a vibration number range in which abnormal dispersion occurs in any portion of the optical path. For example, in the portion immediately following incidence (z=0, r=0.425), the dispersion with respect to a vibration number of $\omega$=0.61 to 0.62 is small. However, in the case of r=0.40 to 0.41 (z=30 to 50), the dispersion is sufficiently large; accordingly, the optical paths of vibration numbers in this range can be separated by causing the light to pass through this portion even if the size of the photonic crystal is not very large. On the other hand, when light in the vicinity of $\omega$=0.63 reaches the vicinity of r=0.39 (z=60), other bands with the same vibration number appear, creating an obstacle when light splitting is performed. However, since the dispersion in the vicinity of r=0.42 is large, so that the x component of the direction of advance is sufficiently large, the operation is finished without reaching the region where r=0.39.

Thus, by using a photonic crystal in which the structure varies, it is possible to broaden the wavelength range to be handled while maintaining the compactness and high dispersion characteristics of the dispersion element based on the photonic crystal. Here, furthermore, the rate of variation in the structure was made constant; however, it would also be possible to vary this rate of variation according to the position, so that the relationship between the wavelength at the crystal outlet and the position is varied.

Figure 5:
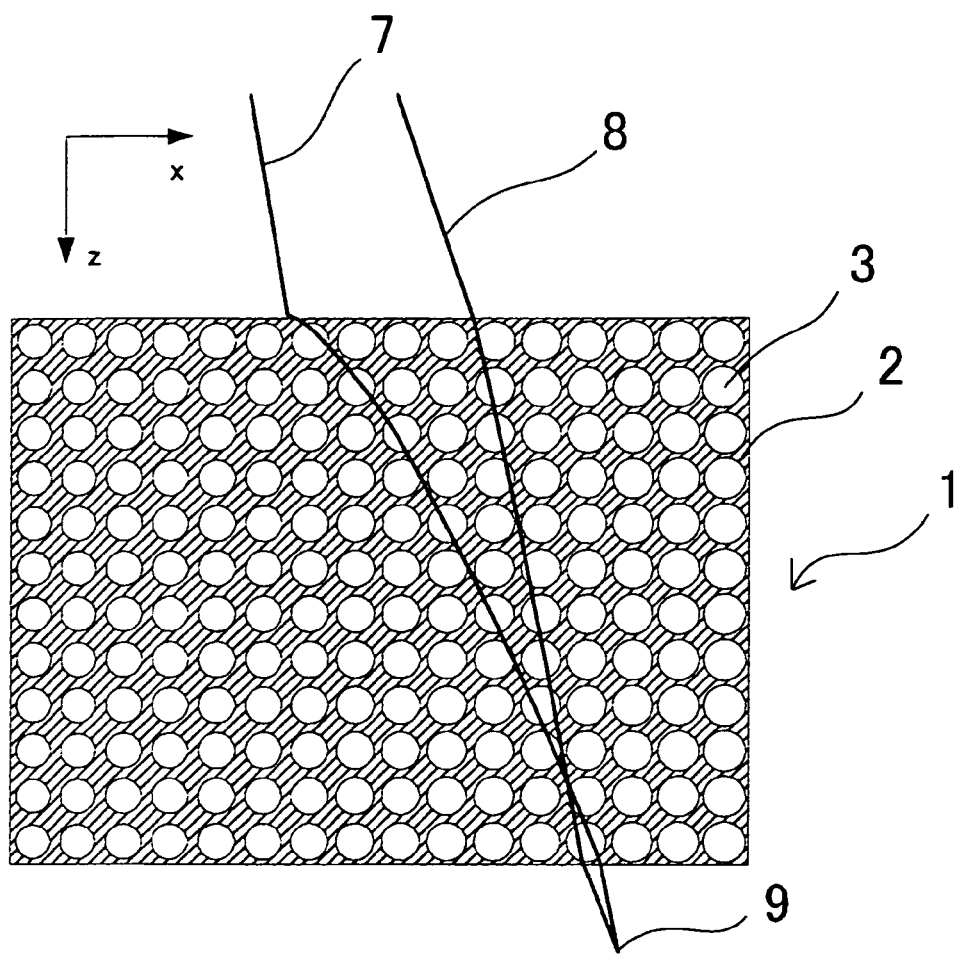
FIG. 5 is a model diagram showing a condenser element constituting an example of a working configuration of the present invention.

FIG. 5 shows a model diagram of a condenser element constituting one example of a working configuration of the present invention. Here, the basic construction of the photonic crystal that is used is basically the same as in the case of the working configuration described above. However, this working configuration differs as follows: namely, in the photonic crystal shown in FIG. 5, the size of the air holes 3 is the same in the direction of the z axis, and the radius r of these air holes 3 gradually increases from left to right in the direction of the x axis in the plane of the page.

In FIG. 2, the relationship in a case where the angle of incidence is 10° and $\omega$ is 0.61 is indicated by a thick solid line, and the relationship in a case where the angle of incidence is 15° and $\omega$ is 0.61 is indicated by a thin broken line. As is seen from a comparison of both sets of data, the angle of refraction increases as the angle of incidence decreases, and the angle of refraction increases as the value of r decreases. Accordingly, if the angle of incidence decreases as the value of r decreases, the angle of refraction is further increased by a synergistic effect.

From this, if a light beam is caused to be incident on the photonic crystal 1 shown in FIG. 5 from the upper side along the z axis in the plane of the page, the light advances through the photonic crystal; however, since the crystal structure differs according to the position of incidence, the direction of advance of the light varies according to the position of incidence.

Specifically, as is shown in FIG. 5, when light 7, 8 with a so-called tendency toward divergence in which light rays 7 that are incident on the positions of air holes 3 that have a relatively small r value show an angle of incidence that is smaller than the angle of incidence of light rays 8 that are incident on the positions of air holes 3 that have a relatively large r value is caused to be incident on the photonic crystal 1, the angle of refraction of the light rays 7 is greater than the angle of refraction of the light rays 8.

Accordingly, when a light beam is caused to be incident with a tendency toward divergence, the light rays at both ends intersect at a certain point. If the angle of incidence is not uniform, this phenomenon occurs even if the crystal is not a photonic crystal with the structural variation of the present invention; however, by using a photonic crystal with the structural variation of the present invention, it is possible to provide the device with an operation corresponding to aberration correction, so that the convergent performance is improved. After leaving the crystal, the light rays advance in the same direction as prior to incidence; accordingly, if the device is devised so that the light rays leave the crystal some time after convergence, the light rays can again be gathered at the spatial point 9 following emission.

The concrete path of the light rays in this case can be calculated as follows:

$$x(z) = \int_0^z \tan\{\theta(\omega, k_x, r(x(\varsigma)))\} d\varsigma + x_0$$

Here, $x_0$ is the x coordinate of the light rays when z=0. Here, the diameter of the holes is a function of x. The optical path of light rays in which the angle of incidence varies slightly with respect to the optical path x(z) of certain light rays, i.e., the optical path of light rays in which $k_x$ varies as $(k_x+\delta_k)$, is as follows:

$$x_1(z) = \int_0^z \tan\{\theta(\omega, k_x + \delta_k, r(x(\varsigma)))\}d\varsigma + x_0$$

$$= x(z) + \delta_k \int_0^z \frac{\partial}{\partial k_x}\tan\{\theta(\omega, k_x, r(x(\varsigma)))\}d\varsigma$$

On the other hand, in a case where the incident position varies from $x_0$ to $(x_0+\delta_x)$, the optical path of the light rays is as follows:

$$x_2(z) = \int_0^z \tan\{\theta(\omega, k_x, r(x(\varsigma)))\}d\varsigma + x_0 + \delta_x$$

Where the amount of displacement from the original light ray optical path is taken as $\delta(z)$, and the differentiation of $x_2$ by z is considered, the following equation is obtained:

$$\frac{\partial x_2(z)}{\partial z} = \tan\{\theta(\omega, k_x, r(x_2(z)))\}$$

$$= \tan\{\theta(\omega, k_x, r(x(z) + \delta_2(z)))\}$$

$$= \tan\{\theta(\omega, k_x, r(x(z)))\} +$$

$$\delta_2(z)\frac{\partial r(x(z))}{\partial x}\frac{\partial}{\partial r}\tan\{\theta(\omega, k_x, r(x(z)))\}$$

It is possible to calculate the path of the light rays by calculating these equations in numerical terms. In order to construct a condenser element, it is sufficient to design this element so that the position $x(z)$ at a specified $z_0$ does not vary even if the parameters kx and $x_0$ vary, i.e., so that the following equations are obtained:

$$\frac{\partial}{\partial k_x}x(z_0) = 0, \quad \frac{\partial}{\partial x_0}x(z_0) = 0$$

Here, $k_x$ and $x_0$ are not independent, but have a relationship that is determined by the position of the incident light, the divergent (convergent) angle, the diameter of the light beam, and the like.

In the case of use in areas of abnormal dispersion, there is no great expectation of a proportional relationship between the amount of variation in $k_x$ and the amount of variation in the optical path. Accordingly, in the case of an ordinary photonic crystal in which the characteristics are not dependent on $x_0$, the diameter of the light beam that can be gathered is small. However, as is seen from the equations described above, since the effect on the path when both parameters vary is different, "aberration" can be eliminated if both of these parameters are combined using a photonic crystal in which the structure varies, so that incident light in a broader range can be gathered.

In the working configurations described above, examples of a spectroscope and a condenser were described which use as an optical element a photonic crystal with the diameters of the air holes in this photonic crystal gradually varied; however, a similar effect can also be obtained by gradually varying other structural elements in the photonic crystal.

The invention claimed is:

1. A photonic crystal forming an optical element, said photonic crystal comprising:
   a plurality of substances which have different refractive indices and which are arranged to form a periodic structure having a fixed period length along an axis of the photonic crystal;
   wherein a constituent ratio of the substances at each period of the periodic structure is different from a constituent ratio of the substances at a previous period, such that a constituent ratio of the substances gradually changes along the axis of the photonic crystal, so that anomalous refraction of incident light, which is made up of light having a plurality of different wavelengths, traveling through the photonic crystal occurs at different positions on the axis in the photonic crystal based on the different wavelengths of the incident light, and so that a direction of advance of the incident light in the photonic crystal is different for the different wavelengths of the incident light.

2. A spectroscope using the optical element formed by the photonic crystal according to claim 1.

3. The spectroscope according to claim 2, wherein the incident light is incident on the photonic crystal at an angle with respect to said axis of the photonic crystal that is not more than 45°.

4. A condenser using the optical element formed by the photonic crystal according to claim 1.

5. The condenser according to claim 4, wherein the incident light is incident on the photonic crystal at an angle with respect to said axis of the photonic crystal that is at least 45°.

6. A photonic crystal forming an optical element, said photonic crystal having a structure such that as incident light made up of light having a plurality of different wavelengths travels through the photonic crystal, anomalous refraction of the incident light occurs at different positions on an axis in the photonic crystal based on at least one of the different wavelengths and different incident angles of the incident light, and such that a direction of advance of the incident light in the photonic crystal is different for the at least one of the different wavelengths and the different incident angles of the incident light.

7. A spectroscope using the optical element formed by the photonic crystal according to claim 6.

8. A condenser using the optical element formed by the photonic crystal according to claim 6.

9. A spectroscope comprising a photonic crystal;
   wherein the photonic crystal has a crystal structure that gradually varies along an axis of the photonic crystal and along a path of advance of incident light, which is made up of light having a plurality of different wavelengths, traveling through the photonic crystal, so that anomalous refraction of the incident light occurs at different positions on the axis in the photonic crystal based on the different wavelengths of the incident light, and such that a direction of advance of the incident light in the photonic crystal is different for the different wavelengths of the incident light.

10. The spectroscope according to claim 9, wherein the incident light is incident on the photonic crystal at an angle with respect to said axis of the photonic crystal that is not more than 45°.

11. A condenser comprising a photonic crystal;
   wherein the photonic crystal has a crystal structure that gradually varies along an axis of the photonic crystal, so that anomalous refraction of incident light traveling through the photonic crystal occurs at different positions on the axis in the photonic crystal based on different incident angles of the incident light, and so that a direction of advance of the incident light in the photonic crystal is different for the different incident angles of the incident light.

12. The condenser according to claim 11, wherein the incident light is incident on the photonic crystal at an angle with respect to said axis of the photonic crystal that is at least 45°.

* * * * *